United States Patent [19]

Kroneberger et al.

[11] Patent Number: 4,823,711

[45] Date of Patent: Apr. 25, 1989

[54] THERMAL DECOMPOSITION PROCESSOR AND SYSTEM

[75] Inventors: Gerald F. Kroneberger, Novato; John B. Wilcox, San Jose, both of Calif.

[73] Assignee: In-Process Technology, Inc., Sunnyvale, Calif.

[21] Appl. No.: 88,094

[22] Filed: Aug. 21, 1987

[51] Int. Cl.⁴ .............................................. F23D 14/00
[52] U.S. Cl. ..................................... 110/236; 110/250
[58] Field of Search ............... 110/237, 250, 235, 346; 422/239, 240; 431/5

[56] References Cited

U.S. PATENT DOCUMENTS 4,361,100  11/1982  Hinger ........................... 110/229 X
4,646,660  3/1987  Bjorkman et al. ............. 110/250 X
4,688,495  8/1987  Galloway ........................... 110/250

FOREIGN PATENT DOCUMENTS 1121262  1/1962  Fed. Rep. of Germany ...... 110/250

Primary Examiner—Edward G. Favors
Attorney, Agent, or Firm—Alvin E. Hendricson

[57] ABSTRACT

A system for thermally decomposing chemical materials efficiently and controllably heats input feed materials to very high temperatures for decomposition in the presence or absence of oxygen by heating means that may be disposed peripherally or intermediately of reaction zones may be of the protected type and may include preheating of feed material and process gas.

27 Claims, 3 Drawing Sheets

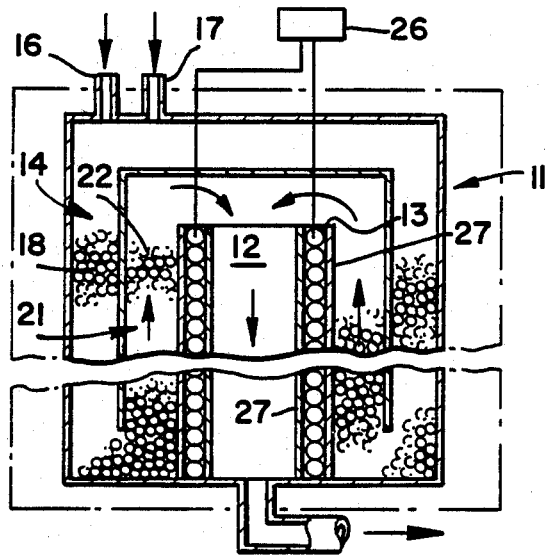
FIG_1
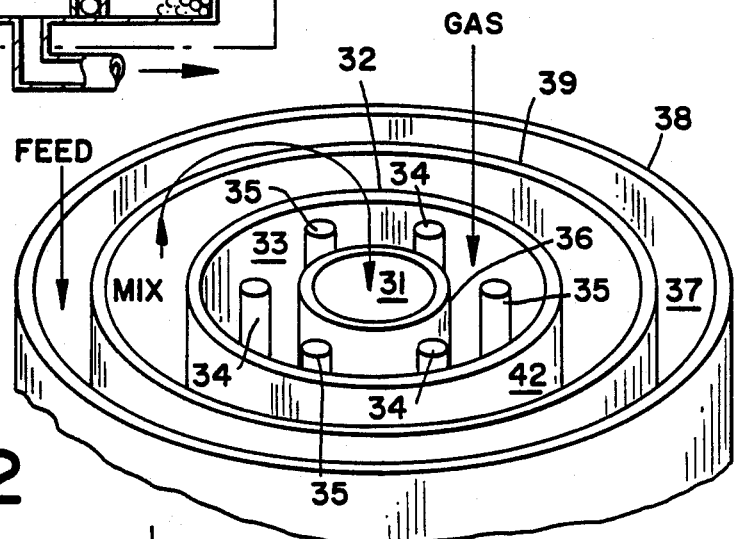
FIG_2
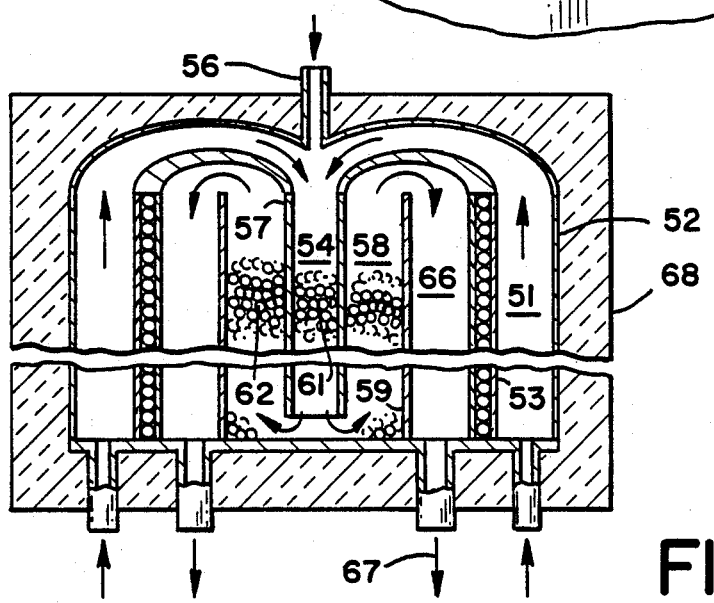
FIG_3

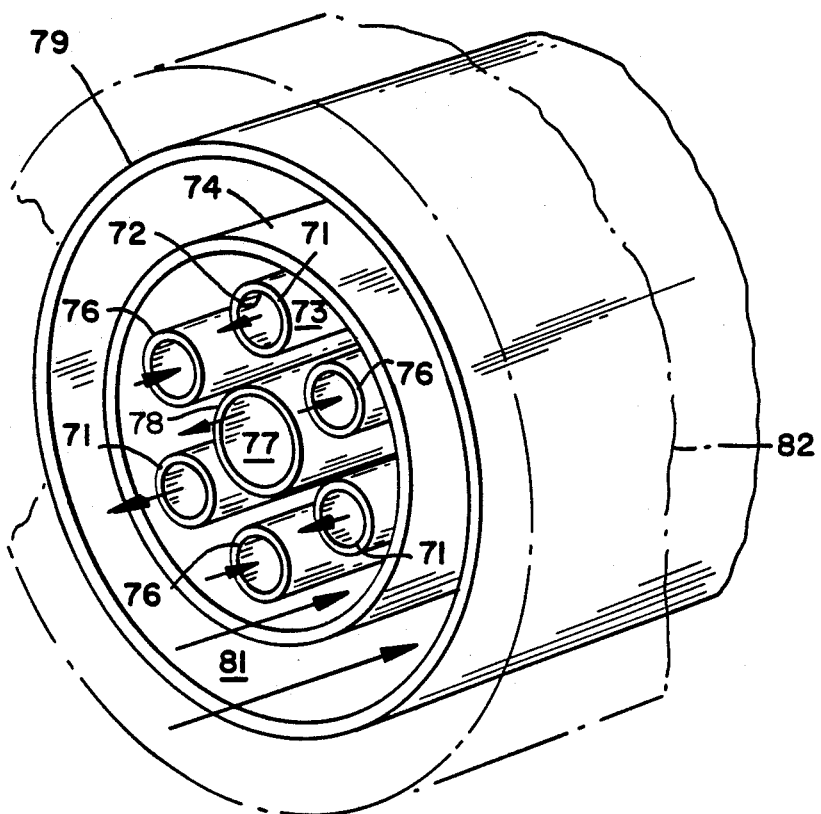
FIG_4
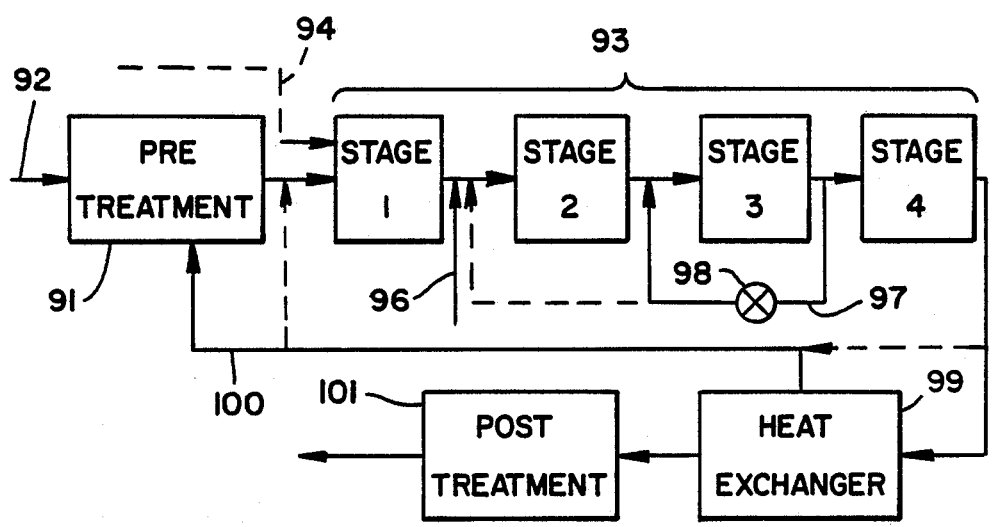
FIG_5

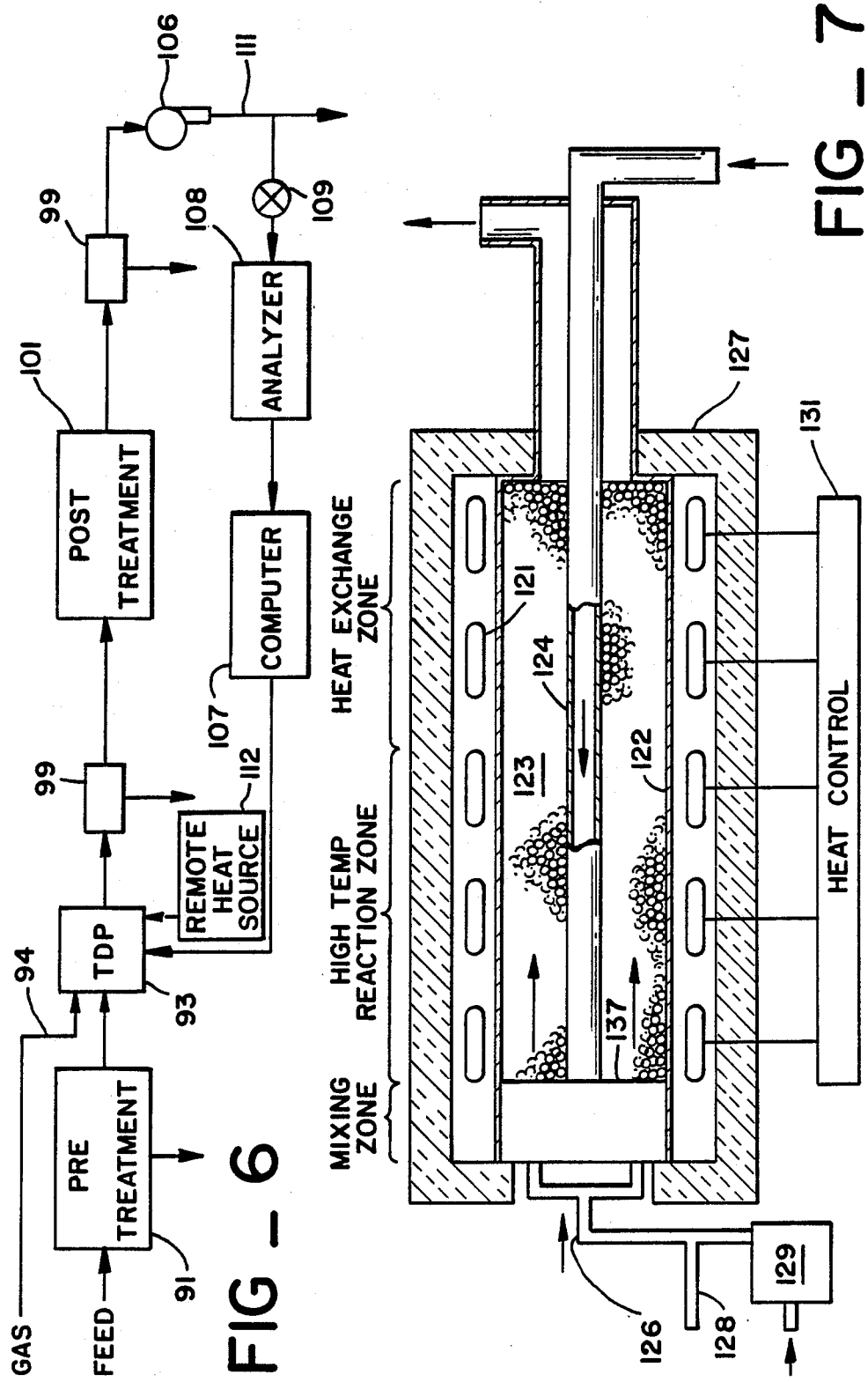

THERMAL DECOMPOSITION PROCESSOR AND SYSTEM

BACKGROUND OF THE INVENTION

Many industries employ and/or produce as by-products of various processes materials that require additional processing to place these materials in condition for further handling or disposal. At least certain of these materials may in fact be hazardous to the environment and to living organisms that may come in contact therewith so that these and other materials are often treated in what is commonly termed a thermal destruction reactor wherein very high temperature reactions are carried out to thermally decompose materials and these reactions may occur in oxidizing, inert and/or reducing environments and combinations thereof.

Conventional reactors designed to carry out thermal decomposition reactions are quite large and expensive and furthermore, incorporate limitations as to materials that can be operated upon. In this respect, reference is made to U.S. Pat. No. 3,933,434 to Matovich and following patents of the same inventor. Many of these types of reactors are limited to operation upon materials having a particular physical form and others are useful only for burning trash or the like, but most cannot produce sufficiently complete combustion in order to meet the increasingly stringent regulatory requirements for processing and/or disposal of liquid or gaseous organic materials.

The present invention provides a simple safe process and system operating at sufficiently high temperatures for substantially complete decomposition of organic chemicals and comprises an improvement on the invention of Galloway disclosed and claimed in U.S. patent application Ser. No. 760,944, filed 7/31/85 and issued as U.S. Pat. No. 4,688,495 on Aug. 25, 1987, and assigned to the same assignee as the present application.

SUMMARY OF THE INVENTION

The present invention provides a thermal processor and system for operating upon mixtures of organic chemicals and process gases at high temperatures to decompose such materials into basic components such as carbon dioxide and water and/or intermediate products depending upon the desired results. The present invention is particularly directed to the provision of relatively small potentially mobile processors and systems that may be employed at the site of organic chemical production or desired disposition so as to directly cooperate with other systems and preclude the necessity of transporting organic materials to large distant installations for further processing.

The present invention is particularly advantageous in providing for control of parameters affecting the processing therein. In particular, the present invention provides for control of temperatures not only with regard to the overall processor, but also with respect to various processing zones therein as well as control over the rate of feed of input materials to be processed and also the flow portion of process gas when the latter is employed. Thus the present invention provides for controlling temperature and residence time of feed material and process gas in processing zones of the present invention, and furthermore provides alternatives with respect to physical structures to accommodate feed materials of various physical states and/or chemical compositions.

The present invention particularly provides protected heating means within the system thereof for minimizing maintenance problems and extending the life of elements thereof while allowing processing of a wide variety of potentially corrosive materials. Of course, the heating means need not be protected in circumstances wherein no corrosive material or products are employed or produced. Additionally, the present invention provides for the utilization of peripheral heat sources as well as external heat sources and heat sources disposed intermediate between the periphery and center of processors. Such arrangements are particularly advantageous for various types of materials to be processed.

BRIEF DESCRIPTION OF DRAWINGS

The present invention is illustrated with respect to particular preferred embodiments of the invention in the accompanying drawings, wherein:

FIG. 1 is a schematic longitudinal sectional view of a processor in accordance with the present invention;

FIG. 2 is a schematic perspective view of elements of a further embodiment of a processor in accordance with the present invention;

FIG. 3 is a schematic longitudinal sectional view of another processor embodiment having a peripheral heat source;

FIG. 4 is a schematic perspective sectional view illustrating the relationship of elements of a processor having multiple intermediate heat sources;

FIG. 5 is a block diagram of a system in accordance with the present invention and including recycling;

FIG. 6 is a block diagram of a system in accordance herewith and indicating automated control; and FIG. 7 is a schematic illustration of yet another embodiment of a processor in accordance with the present invention.

DESCRIPTION OF PREFERRED EMBODIMENT

The present invention is adapted to operate upon a wide variety of different materials for thermally decomposing such materials into basic components, and, in the instance wherein hydrocarbons are operated upon, the end result of the present invention may comprise carbon dioxide and water, although it is noted that such end products may be produced by passing material through one stage or through successive stages of the present invention wherein the output of certain stages may comprise some intermediate products. Referring to FIG. 1 of the drawings there will be seen to be schematically illustrated a thermal decomposition processor 11 defining a central reaction zone 12 surrounded by a heater or heating means 13. Volatilized or gaseous materials to be decomposed are passed through this reaction zone 12, preferably in combination with a process gas, that may in some circumstances comprise air and in other circumstances other oxidizing or non-oxidizing gases depending upon the nature of the reaction to be carried out. The embodiment of the invention illustrated in FIG. 1 provides for preheating the process gas and feed material, and to this end there is illustrated an outer heating zone 14 fed by a gas line 16 and a feed line 17 for directing gas and feed material into such zone. The zone 14 may be comprised in whole or in part as a packed bed 18 formed of porous or non-porous spheres or the like of material for improving heat transfer and mixing of the gas and feed material passing through the zone. The elements of the packed bed 18 may also serve the purpose of catalyzing reactions in the processor by proper selection of materials of the packed bed. This outer heating zone 14 communicates with an inner super heating zone 21 which may also be comprised in whole or in part by a packed bed 22, and which communicates with the outer heating zone 14 and the inner reaction zone 12. The above-noted zones may be defined by vertical or horizontal concentric cylinders as illustrated, for example, or alternatively may be defined by a wide variety of different shaped walls with the zones having either uniform or non-uniform cross sections.

The general structure illustrated in FIG. 1, and briefly described above, is similar to prior art thermal processors, however, it is particularly noted that this embodiment of the present invention provides the utilization of heating means that are not subject to contact with materials being processed, nor contact with products of such processing. As shown, the heater 13 may, for example, be comprised as a coil of heater wire energized from an external power supply 26, with the heater wire disposed within sealed walls 27 formed of a material that is not affected by extremely high temperatures that may reach 3000° Fahrenheit or more, for example. Separation of the heating means from the reaction zone in particular is highly advantageous in the processing of certain materials which may themselves be highly corrosive, or which produce intermediate decomposition products that are highly corrosive. The materials forming the walls of the reaction zone 12, in this case the heater walls 27, are formed of a refractory metal or non-metallic material such as Inconel, tantalum, tungsten, various forms of silicon dioxide, beryllium oxide, aluminum oxide and the like including Cermets that are capable of withstanding very high temperatures and contact with highly reactive materials at such temperatures. It is known to form heating elements of processors of high temperature electrically conducting ceramic materials, such as silicon carbide, titania, or zirconia, however, even these materials are subject to deterioration with continued use in a processor of the present type, and thus it is advantageous for particular applications, such as noted above, to separate the heating means from the reaction zone to minimize replacement costs and other difficulties. It is furthermore noted in this respect that the reaction zone 12 is to be raised to a substantial temperature, i.e. from about 800° Fahrenheit to 3000° Fahrenheit or more, depending upon the reaction to be carried out, and such temperatures may be achieved by a variety of types of thermal or radiative energy, such as microwave, plasma, infrared, dielectric, combustion of fossil fuel or the like. In addition, at least certain of these heat sources are readily adapted to be located exteriorly of the processor, as for example, in axial orientation with the reaction exteriorly of the processor itself. Such arrangements also serve to protect the heat source from corrosion or progressive deterioration by contact with highly reactive materials that may be introduced into or produced within the reaction zone. Thus, for example, in the thermal decomposition of chlorinated hydrocarbons there may be produced hydrogen chloride which is highly corrosive to many materials.

It will be seen from the foregoing that the present invention preferably includes, in addition to a very high temperature reaction zone, certain additional zones for preheating a process gas and feed material to be decomposed. It is also noted that the feed material is herein considered to be in a gaseous or vaporized form, although the present invention is capable of operating upon finely divided solid particles or material. In this latter instance, it is generally necessary to provide the reaction zone 12 as an elongated zone through which finely divided solid particles may be carried by process gas. Alternatively, in a vertical configuration when the solid material is fed by gravity through the zone, process gas may be provided in a counterflow direction to extend the residence time of such particles in the reaction zone. Under such circumstances, the solid feed material should not be passed through packed beds and would ordinarily be directly injected into the reaction zone, as by directing the feed line 17 into the top of the reaction zone 12 with only the process gas and volitalized feed material being passed through the heating zones 14 and 21.

As determined by specifics of the process and system location the heating means can range from the resistive type of elements described in detail in U.S. Pat. No. 4,684,495 to the more complex types involving microwave and induction heating as well as plasma and fossil fueled types of heat generators. This application makes no claim with respect to the design of the heat energy sources themselves. The invention does include a method of protection wherein certain heat source are protected from the action of the materials being processed by a non-reactive wall or a coating which is integral with the surface of the heat source. Additionally, the heat addition or removal source may be remotely located as schematically indicated at 112 of FIG. 6, for example With regard to the heating of a reaction zone in accordance with the present invention, it is noted that it may be desirable to employ a multiplicity of heaters, and in this respect reference is made to FIG. 2 schematically illustrating a processor having means defining a central reaction zone 31 with means such as a cylinder 32, thereabout defining a gas heating zone 33 wherein a plurality of encapsulated heaters 34 are disposed. Such heaters 34 may, for example, comprise electrical resistance heaters exteriorly energized from a power supply, not shown, and encased in heat conducting walls of a material substantially impervious to very high temperatures and materials that may pass thereover, or coated with such material. Cooling means 35 may also be provided about the cylinder 36 for removing heat from the reaction zone for complete control over the temperature therein. Additionally, means defining the reaction zone such as, for example, a hollow cylindrical wall 36 is also formed of a very high temperature material which is substantially impervious to input materials and reaction products, such as for example, alumina or the like, and furthermore which has good heat conducting properties. Exteriorly of the foregoing, there is provided a preheat zone 37 defined by an outer shell 38 and an inner shell 39 through which input material is passed, as for example, from the top to the bottom as indicated by the arrow therein. In this embodiment of the present invention a process gas is adapted to be passed through a heating zone 33 about the reaction zone 31 as from the top to the bottom therein, and mixing zone 42 defined between the walls or shells 32 and 39 communicates with the zone 33 and 37 at the bottom of the processor. Consequently, feed material and process gas are mixed together in the mixing zone 42 which may in part or in whole comprise a packed bed of thermally conducting spheres or the like for mixing or further heating of the processed gas and feed material in passage upward through this zone 42. At the top or end of the processor of FIG. 2, connection is made between the mixing zone 42 and the reaction zone 31 so that the thoroughly mixed and preheated feed material and process gas is directed downwardly through the reaction zone 31 for thermal decomposition, and exit from the processor at the bottom of the reaction zone. Thermal decomposition may be carried on in part or in toto in the reaction zone, and under those circumstances wherein the decomposition is not completed, the intermediate products exiting the bottom of the reaction zone would normally be directed into a further processing zone. Thus, for example, if pyrolysis is to be accomplished in the reaction zone 31, i.e. heating in absence of oxygen for reduction of the feed material, it may well be that the products of the reaction zone yet require further processing as, for example, in a subsequent or following reaction zone wherein oxygen is added, as in the form of air to complete the thermal decomposition. This is further noted below.

For various applications of the present invention, it may be desirable to provide a different physical structure of the processor wherein the heating means are disposed externally of the system, and one such configuration is illustrated in the FIG. 3. As shown therein, a preheat zone 51 is defined between an exterior shell 52 and heater 53 that may be encapsulated in cylindrical walls thereabout, and through which a process gas may be passed from the bottom or the top, or in the instance of a horizontally extending processor, from one end to the other. Preheated process gas passes from the outer zone 51 to a central axial mixing zone 54 wherein feed material is inserted for mixing with the process gas, as indicated at 56. Walls 57, defining the axial mixing zone 54, form the inner boundary of a second mixing zone 58, with walls 59 defining the outer boundary thereof. The zones 54 and 58 are connected together at the bottoms of same, and may be filled in whole or in part with packed beds 61 and 62 respectively for creating a turbulent flow of process gas and feed material to completely mix same and to maximize heat transfer to such mixture. Between the wall 59 and heater 53, there is defined a reaction chamber 66, which in the illustrated embodiment may be generally cylindrical and through which the preheated and mixed gas and feed material is passed from the top to the bottom for thermal decomposition of the feed material, and exiting of the products of reaction from the bottom of the processor, as indicated in 67. It will be appreciated that the flow of preheated gas from the preheat chamber 51 to the mixing chamber 54 may be accomplished by an integrated structure, ducts, pipes or the like at the top or end of the processor, as generally indicated in FIG. 3. It is also noted in this embodiment of the present invention, as well as prior described embodiments, the processor is preferably surrounded by insulation 68, also having reflecting surfaces for preventing the escape of heat from the processor.

There have been described above, alternative embodiments of the present invention which employ a protected heat source that, while being in heat-conducting relation to the reaction zones and reacting materials, is physically isolated from the material being processed for minimizing degradation of the heat source by such materials or intermediate products of reaction or decomposition. The heat source may, as shown and described above, be provided as a central heat source or peripheral heat source with the latter having the advantage of maximum access to the heating unit, and the capability of employing more commercially available items.

With regard to the walls or the like defining separate zones of a processor in accordance with the present invention it is noted that in many cases the walls defining the reaction and preheat/reheat zones will be impervious to the flow of gases and vapors. In particular instances the major sections of the zone confinement may be pervious to obtain benefits from the cross flow capabilities between zones offered thereby.

There may be also employed configurations employing an intermediate heat source or sources and one such arrangement is schematically illustrated in FIG. 4 showing a cross sectional of view a processor that may be either vertically disposed or horizontally disposed. As shown, this embodiment includes a plurality of hollow heaters 71 which may also be comprised as resistance wires disposed in sealed concentric walls 72, and each defining a central passage therethrough. These heaters are disposed longitudinally in a chamber 73 defined by an inner shell 74 having a plurality of tubes 76 extending therethrough and a central longitudinal reaction zone 77 defined by a cylinder 78. An outer shell 79 defines with the inner shell 74, an elongated annular space 81 exteriorly of the inner chamber 73, and insulation 82 is provided about the outer shell 79. It is possible with this configuration to pass process gas such as air, and feed material in a variety of different paths, and considering one advantageous arrangement, process gas may be passed to the left in the Figure through the interior of heaters 71 for preheating same and, at an end of the processor, these heater tubes are connected to the tubes 76 so that the air is returned through the processor to the opposite end thereof. Gaseous or vaporized feed material may be introduced into space 81 of the processor at the left thereof to thus pass to the right for preheating of such material. At the far end of the processor the process gas and feed material are mixed and by means of a suitable manifold or the like are fed into the central tube 78 to pass from right to left therethrough, and then exit into the chamber 73 where the products of reaction or decomposition pass to the right about the tubes and heaters to the far end of the processor where they are removed from the processor.

It will be seen that in the embodiment schematically illustrated in FIG. 4, the present invention provides for location of multiple heating units in a position intermediate between a central reaction zone and the exterior periphery of the processor. Both feed material and process gas are preheated in the processor before being mixed and passed through the central reaction zone 77, and furthermore, the reaction products can be then passed back through the processor via the large central chamber 73 wherein heat may be extracted therefrom by incoming feed material and process gas.

These chambers may include packed beds as previously described. As noted above, this arrangement may be disposed with the tubes and the like in vertical orientation or horizontal orientation, and the illustration is intended to depict a horizontal arrangement so that the small arrows in the various spaces are indicative of the direction of flow therethrough.

The present invention provides for controlling thermal destruction reactions or processes by controlling the temperature within the processor and within separate stages or zones thereof, and controlling the residence time of materials to be processed in such processor zones. The present invention is particularly adapted to controlled recycling of materials either through the entire processor or through stages or zones therein. Referring in this respect to FIG. 5, there is shown an overall system including a pretreatment stage 91 which may, for example, comprise a volatilizer for volatilizing an input or feed material supplied thereto, as indicated at 92. It should be noted that heat from the processed gases may be utilized as the heat source in the vaporizer. The input of feed material to the present invention may be continuous or from a dual batch device providing for switching between batches for substantially continuous feed. The output of this pretreatment unit or stage is applied to the thermal decomposition processor 93 having a plurality of successive zones or stages identified in FIG. 5 as stage 1, stage 2, etc., with such stages being illustrated as serially connected stages. In the instance wherein stage 1 of the processor 93 may, for example, comprise a pyrolysis unit, there may be applied to the input thereof a nonreactive process gas, as indicated at 94, and considering that stage 2 of the processor may be designed to operate in the presence of oxygen, air may be injected into stage 2, as indicated at 96. It is believed to be clear that the present invention may be employed to recycle all or portions of materials being processed therein. Thus in Figure 5,there is shown a recycle line 97 extending from the output of stage 3 to the input thereof through a control valve 98. This recycle line 97 might as well extend to the input of stage 2, for example, and it is again noted that these stages may comprise separate zones in a process or may comprise complete processors. As also shown in FIG. 5, the output of the processor 93, or multiplicity of processors, is passed through a heat exchanger 99, which may be internal or external to the processor or processors, and the products of the processor are normally then passed through a post-treatment unit 101 which may, for example, include a scrubber of the wet or dry type. Internal or external heat recovery units 99 may be connected to the pretreatment unit 91 to volatilize the feed material as shown at 100, or the hot process gases may be used directly for the volatilization or for recycle as shown by the dotted lines to and from line 100 of FIG. 5.

Considering further an overall system in accordance with the present invention and referring to FIG. 6, there will be seen to be illustrated a system generally in accordance with that described above with respect to FIG. 5 and further including means for forcing the flow of process gas and material through the system. Such means, for example, may comprise a vacuum pump 106 located at the exit of the system for reducing pressure at the exit of the system that will cause gas and feed material to be drawn there through. Alternatively, the system may be operated under positive pressure wherein the input material and process gas are pumped into the ssytem so that the pump 106 may be provided ahead of the processor. Control of the present system may be accomplished by means of a computer 107 operating upon information provided by an analyzer 108 connected through a valve 109 to an outlet line 111 from the system. By analyzing the output of the system, it is possible to determine the constituents of such output, and thus to control certain parameters of the processor for achieving the desired or expected mix of constituents or the identity of same. By appropriately programming the computer, it is possible then to provide control signals to the thermal destruction processor 93 for controlling the temperature of the processor including the temperature of different zones therein, the volume or rate of feed material entering the system, the volume or rate of process gas fed into the system, and also the pressure within the system. By appropriate control of these parameters, it is then possible to establish the temperature and residence time of input materials at such temperature for achieving the desired reactions or degrees of decomposition within the system as a whole and also within portions or zones of the system to ensure production of the desired output. It is further noted that the computer 107 need not be located in the same physical environment as the thermal destruction processor, but may, for example, be located in some remote location wherein the operation of the system may be monitored and controlled. Computer control may also be provided for the pretreatment and post-treatment as well as controlling parameters of the thermal decomposition processor.

It should be understood that there are variations in the heat transfer requirements for the processes compatible with the equipment systems described herein. This not only applies to the different processes, but also the same process can have a heat requirement during start up and stabilization, and a cooling requirement after the process has established its equilibrium conditions. Correspondingly, the equipment systems can be fitted with both heating and cooling media in the same zones and in adjacent zones for the purposes of satisfying this requirement. This principle is applicable to both of the types system that have been illustrated, i.e. those with axial and those with roundabout heat transfer configurations; as well as the other configurations presented. In many cases, the preheated media will serve this function, in others a separate stream will be needed to provide the proper balance.

As noted above, the physical configuration of the thermal destruction processor of the present invention is capable of substantial variation, with certain advantages being attained with alternative configurations for particular applications of the invention. Thus, for example, certain decomposition reactions may produce heat, possibly in a violent manner and under these circumstances it is important to prevent extension of such reactions outside of predetermined portions of the processor. In this respect, reference is made to FIG. 7 schematically illustrating a physical configuration of a processor particularly adapted to handle materials reacting with process gas to generate heat. As shown, a protected "heater" 121 is provided about a shell 122 which may be provided as an enlongated hollow cylinder, for example, and insulation 127 is disposed about the heater and shell. The "heater" 121 may serve to supply and/or remove heat along the length thereof, as further discussed below. Within the shell 122, there is provided a chamber 123 that may optionally comprise a packed bed with a tube or the like 124 extending axially therethrough. Process gas, such as air, is introduced into the tube 124 at the right end thereof in the illustration, and exits from the left end so that gas passing through the tube will be preheated. It should be noted in this respect that process gas should normally be preheated before mixing with feed material in order to prevent a quenching affect by cold gas. Liquid/vapor feed material is fed into the left end of the chamber or packed bed 123 and to this end there is shown an inlet pipe 126. The packed bed may be filled with high temperature material that may be either inert, catalytic or chemically reactive. A mixing unit or chamber 137, disposed in the left end of the shell 122, receives feed material via the inlet pipe 126 and preheated process gas from the tube 124 for mixing the feed material and gas that is then directed into the chamber or packed bed 123, as indicated by the arrows therein. The foregoing provides proper dispersion of the gases and vapors within the bed or chamber 123. In accordance with the present invention, the feed material may be originally provided as liquids or gases through inlet line 128 connected to the pipe 126 or, alternatively, may be provided as various types of liquids, solids, sludges, or the like, applied to a volatilizer 129 that is connected to the inlet pipe 126. Various other alternatives are possible in accordance with this embodiment of the present invention, and thus for example, the unit may be reversed, or the central tube 124 may be fed with process gas, feed material, or a mixture of process gas and feed material as a secondary inlet of feed material.

Within the chamber or packed bed 123, decomposition reactions are carried out and the temperature for initiating such reactions is achieved adjacent the left end of the unit by heat supplied from the heater 121. Such temperatures for initiating decomposition and maintaining reactions may be of the order of 800° Fahrenheit to 3000° Fahrenheit or more depending in part upon the material being decomposed and the degree of decomposition desired.

In the circumstance wherein the process gas and feed material react with the generation of heat, it may be possible to maintain the desired reaction temperature by heat generated from such reaction or reactions after the reactions have been initiated. Furthermore, it may be be necessary to remove heat from the reaction zone in order to maintain a desired temperature therein, or in portions thereof, in the above identified circumstances.

With regard to the foregoing, reference is again made to FIG. 7 wherein it will be seen that the processor thereof is divided into successive zones along the length thereof, and for example, the first zone is shown to be a mixing zone wherein process gas and feed material are mixed, and this is followed by a high temperature reaction zone which is at least initially raised to reaction temperatures by the heater or heating means 121. This zone is followed by a heat exchange zone wherein heat may be removed from the reaction zone, as for example, by portions of the "heater" 121 thereat serving as a cooler so that the reaction products exiting the right end of the processors will have at least a substantial amount of heat removed therefrom. It is noted in this respect that a certain amount of heat may be removed from the reaction products by the process gas or the like passing through the central tube 124, however, additional heat may be required to be removed, either from the portion of the chamber or bed 123 indicated as a heat exchange zone or under certain circumstances, even from the high temperature reaction zone should the reaction occurring therein produce an overabundance of heat or as to unduly raise the temperature therein. Thus the "heater" 121 is in fact a plurality of controlled heat exchange units disposed along the reaction chamber or bed and serving to supply or remove heat from successive portions or zones therein for control over reactions produced within the reaction chamber. It is also to be noted that the mixture of feed material and process gas is raised to sufficiently high temperature to initiate heat release reactions only in the interior of the processor itself so that there is no possibility of such reactions extending outside of the processor.

There has been described above various embodiments of the present invention employing one or more protected heat sources disposed peripherally of the processor or intermediate between the periphery and the center of same. A wide variety of materials may be treated in accordance with the present invention, including but not limited to hazardous waste materials. Furthermore, materials to be treated hereby may arrive in solid, liquid, or gaseous form, and at atmospheric or higher pressures. Feed material in accordance with the present invention is treated as may be required to preferably provide same in gaseous or vapor form to the processor hereon, and in the instance of solid materials, same are often reduced to finely divided particles which then are normally passed through the processor vertically and preferably not passed through a packed bed that might otherwise become clogged by such particles. THe case of gas conveyance or rotation al motion of the horizontal unit the particles need not be finely divided. In the situation wherein gaseous or vapor feed materials are employed, it is preferable to include one or more packed beds to maximize heat transfer and mixing of process gas and feed materials, and in these latter circumstances the processor may be arranged for vertical passage of materials or horizontal passage of materials through the processor. Control over the temperature and residence time of feed materials in reaction zones is provided to control the reactions themselves, and it is noted in this respect that the process gas may in fact comprise in whole or in part recycled products from the present system.

Although the present invention has been described above with respect to particular preferred embodiments thereof. it will be apparent to those skilled in the art that numerous modifications and variations are possible and thus it not intended to limit the invention to the precise term of descriptions or details of illustrations.

What is claimed is:

1. A thermal decomposition processor and system comprising
    means defining a reaction zone,
    heat means disposed in heat exchange relation to said reaction zone and having means for controllably supplying heat to or removing heat from said zone,
    said heat means including at least one heat generator physically separated from said reaction zone,
    means passing a feed material in gaseous, vaporized or finely divided form through said reaction zone for decomposition of said material,
    means defining a gas preheating zone for process gas,
    means directing preheated process gas into mixing relation to said feed material prior to passage through said reaction zone for passing preheated gas and mixed feed material through said reaction zone and
    outlet means for removing decomposed material from said reaction zone.

2. The processor and system of claim 1 further defined by said means directing preheated process gas into mixing relation to said feed material including at least one packed bed disposed in heat conducting relationship with said heat means.

3. The processor and system of claim 1 further defined by said reaction zone and said gas preheating zone being concentric, with said heat means being disposed therebetween.

4. The processor and system of claim 1 further defined by said preheating zone disposed concentric with said reaction zone for passage of material and a process gas through said preheating zone, and said heating means being disposed peripherally of said zones.

5. The processor and system of claim 1 further defined by
   analyzing means connected to said outlet means for analyzing the output of said reaction zone, and
   control means connected to said analzyer means and connected to control said heat means and said means passing feed material through said preheating zone and reaction zone for controlling the system.

6. The system of claim 1 further defined by
   means defining additional zones through which feed material and/or process gas is passed, and
   means for recycling feed material and/or process gas through selected zones.

7. The system of claim 1 further defined by
   a preheating zone communicating with said reaction zone for passage of feed material therethrough,
   said reaction zone being disposed about said preheating zone,
   means defining a gas preheating zone about said reaction zone for preheating a process gas passed therethrough and said gas preheating zone communicating with said reaction zone whereat feed material and preheated gas are mixed prior to entry into said reaction zone.

8. A thermal decomposition processor and system comprising
   means defining an elongated reaction zone and having walls that are substantially non-reactive with oxygen and highly reactive chemicals at very high temperatures,
   heating means disposed about said reaction zone exteriorly of the walls thereof and physically separated therefrom for raising the temperature of said reaction zone to very high temperatures, and controlling the temperature profile in the reaction zone
   means defining at least one preheating zone in heat conducting relation to at least said reaction zone and communicating with of said reaction zone,
   means passing feed material and/or a process gas through said reaction zone, and
   a packed bed disposed in at least one said reaction zone and said preheating zone,
   means passing at least one of either of said processing gas or said feed material through said preheating zone before passing through said reaction zone.

9. The processor and system of claim 8 further defined by said preheating zone being disposed axially through said reaction zone for communication with a first end of said reaction zone with said process gas passing through said preheating zone to enter said reaction zone at said first end thereof, and
   means directing feed material into said first end of said reaction zone for mixing with said process gas for decomposition in passage through said reaction zone.

10. The processor and system of claim 9 further defined by
    said reaction zone extending beyond said heating means to a second end of said reaction zone, and
    said preheating zone also extending at least to said second end end of said reaction zone in heat exchange relation thereto for heating of process gas from the entire length of said reaction zone.

11. The processor and system of claim 9 further defined by means passing a reactive process gas through said preheating zone and means passing feed material that is reactive with such gas at a high temperature to produce heat through said reaction zone whereby such reaction occurs only within said reaction zone where preheated gas and feed material are mixed.

12. A thermal decomposition processor and system comprising
    means defining a reaction zone,
    means directing material to be decomposed into a first end of said reaction zone at a controllable rate,
    heat means disposed in heat exchange relation to said reaction zone and physically separated therefrom for raising the temperature of said zone to decomposition reaction temperatures of said material in said zone, and
    control means controlling said heat means to supply heat to and to remove heat from said reaction zone and selected portions thereof
    whereby said material is controllably decomposed in said reaction zone for removal from a second end of said reaction zone.

13. A thermal decomposition processor and system comprising
    means defining an elongated reaction zone,
    heat means disposed about said reaction zone for raising the temperature of said zone,
    means defining at least one preheating zone axially through said reaction zone and separated therefrom with communication therebetween at a first end of the reaction zone and a preheating zone,
    inlet means directing a process gas and material to be decomposed in gaseous or vaporized form into said preheating zone for passage therethrough into said reaction zone whereby said material undergoes decomposition reactions in said reaction zone for removal from a second end of said reaction zone.

14. The processor and system of claim 13 further defined by an outer preheating zone disposed about said heat means and communicating with said axial preheating zone for accommodating passage of a process gas therethrough so that preheated process gas is mixed with said material in said preheating zone prior to entry into said reaction zone.

15. A thermal decomposition process and system comprising
    means defining a reaction zone,
    heating means disposed in heat transmission relation to said reaction zone and including at least one heat generator physically separated from said reaction zone,
    means defining at least one preheating zone communicating with said reaction zone,
    means passing a feed material in gaseous, vaporized or finely divided form through said preheating zone and then through said reaction zone for decomposition of said material,
    means defining a separate gas preheating zone for process gas, means directing process gas through said separate gas preheating zone and then into mixing relation with said feed material prior to passage through said reaction zone for passing preheated and mixed and material and gas through said reaction zone and outlet means for removing decomposed material from said reaction zone.

16. The processor and system of claim 15 further defined by said means directing preheated process gas into mixing relation to said feed material including at least one packed bed disposed in heat conducting relationship with said heating means.

17. The processor and system of claim 15 further defined by said reaction zone and said preheating zone being concentric with said heating means being disposed therebetween.

18. The processor and system of claim 15 further defined by said reaction zone and said preheating zone being concentric and said heating means being disposed peripherally of said zones.

19. A thermal decomposition processor and system comprising
   means defining a reaction zone,
   heat means disposed in heat exchange relation to said reaction zone and having means for controllably supplying heat to said zone,
   means separate from said heat means for controlling the temperature of said reaction zone,
   means passing a feed material in gaseous, vaporized or finely divided form through said reaction zone for decomposition of said material,
   means defining additional zones through which feed material and/or process gases is passed,
   means for recycling feed material and/or processed gas through selected zones, and
   outlet means for removing decomposed material from said reaction zone.

20. The thermal decomposition processor and system of claim 19 further defined said heat means being disposed about said reaction zone and by all of said additional zones being disposed externally of said heat means.

21. The processor and system of claim 19 further defined by
   a gas preheating zone for process gas, and
   means directing preheated process gas into mixing relation to said feed material prior to passage through said reaction zone for passing preheated gas and mixed feed material through said reaction zone.

22. The processor and system of claim 21 further defined by said means directing preheated process gas into mixing relation to said feed material including at least one packed bed disposed in heat conducting relationship with said heat means.

23. The processor and system of claim 21 further defined by said reaction zone and said gas preheating zone being concentric, with said heat means being disposed therebetween.

24. The processor and system of claim 21 further defined by said preheating zone disposed concentric with said reaction zone for passage of material and a process gas through said preheating zone, and said heating means being disposed peripherally of said zones.

25. The processor and system of claim 21 further defined by
   analyzing means connected to said outlet means for analyzing the output of said reaction zone, and
   control means connected to said analzyer means and connected to control said heat means and said means passing feed material through said preheating zone and reaction zone for controlling the system.

26. The system of claim 20 further defined by said additional zones including
   a first preheating zone communicating with said reaction zone for passage of feed material therethrough,
   said reaction zone being disposed about said first preheating zone,
   a second gas preheating zone about said reaction zone for preheating a process gas passed therethrough and said second gas preheating zone communicating with said first preheating zone and at least one of said preheating zones including a packed bed in heat conducting relationship to said heat means whereby preheated feed material and preheated gas are mixed prior to entry into said reaction zone.

27. The system of claim 19 further defined by said heat means including at least one heat generator physically separated from said reaction zone.

* * * * *